(12) United States Patent
Pounds

(10) Patent No.: US 10,486,811 B1
(45) Date of Patent: Nov. 26, 2019

(54) REMOTELY OPERATED AERIAL VEHICLE WITH REDUCED CROSS-SECTION AREA DURING FORWARD FLIGHT

(71) Applicant: Olaeris, Inc, Fort Worth, TX (US)

(72) Inventor: Paul E. I. Pounds, Brisbane (AU)

(73) Assignee: Olaeris, Inc., Burleson, TX (US)

( * ) Notice: Subject to any disclaimer, the term of this patent is extended or adjusted under 35 U.S.C. 154(b) by 175 days.

(21) Appl. No.: 15/483,026

(22) Filed: Apr. 10, 2017

Related U.S. Application Data

(60) Provisional application No. 62/320,715, filed on Apr. 11, 2016.

(51) Int. Cl.
*B64C 39/02* (2006.01)
*B64C 27/08* (2006.01)
*B64C 27/52* (2006.01)

(52) U.S. Cl.
CPC ............ *B64C 39/024* (2013.01); *B64C 27/08* (2013.01); *B64C 27/52* (2013.01); *B64C 2201/024* (2013.01); *B64C 2201/108* (2013.01); *B64C 2201/146* (2013.01)

(58) Field of Classification Search
CPC ....... B64C 39/024; B64C 27/08; B64C 27/52; B64C 2201/024; B64C 2201/108; B64C 2201/146
See application file for complete search history.

(56) References Cited

U.S. PATENT DOCUMENTS

| | | | |
|---|---|---|---|
| 2006/0144994 A1* | 7/2006 | Spirov | B60V 1/06 244/62 |
| 2011/0226892 A1* | 9/2011 | Crowther | B64C 1/30 244/17.23 |
| 2012/0083945 A1* | 4/2012 | Oakley | B64C 27/08 701/2 |
| 2016/0347443 A1* | 12/2016 | Lee | B64C 39/024 |

* cited by examiner

*Primary Examiner* — Rodney A Bonnette
(74) *Attorney, Agent, or Firm* — Michael B. Dodd

(57) ABSTRACT

The present invention extends to methods, systems, devices, and apparatus for remotely operated aerial vehicle with reduced cross-section area during forward flight. In one aspect, a remotely operated aerial vehicle is a rotor based Unmanned Aerial Vehicle (UAV) having a plurality of rotors. A remotely operated aerial vehicle includes a frame, a power source, a plurality of motors, and a corresponding plurality of fixed rotors. The frame includes a top surface. Each fixed rotor in the plurality of fixed rotors is mounted to a corresponding motor from among the plurality of motors. The corresponding motor controls the rotation of the fixed rotor. Each of the plurality of fixed rotors is mounted at a specified angle relative to the top surface. Mounting the fixed rotors at the specified angle minimizes the cross-sectional area of the frame when the remotely operated aerial vehicle flies in a specified direction.

6 Claims, 4 Drawing Sheets

REMOTELY OPERATED AERIAL VEHICLE WITH REDUCED CROSS-SECTION AREA DURING FORWARD FLIGHT

CROSS-REFERENCE TO RELATED APPLICATIONS

This application claims the benefit of and priority to U.S. Provisional Patent Application Ser. No. 62/320,715 entitled "Remotely Operated Aerial Vehicles With Reduced Cross-Section Area During Forward Flight", filed Apr. 11, 2016 by Paul E. I. Pounds, the entire contents of which are expressly incorporated by reference.

BACKGROUND

Background and Relevant Art

The number of remotely operated (e.g., piloted) aerial vehicles, including unmanned aerial vehicles (UAVs), being flown continues to increase. A variety of different entities including hobbyists, delivery companies, intelligence agencies, surveyors, power companies, etc. use Remotely Operated Aerial Vehicles. Some Remotely Operated Aerial Vehicles operate past line of sight. On an ongoing basis and/or at a destination, the Remotely Operated Aerial Vehicle provides images and/or video of its surroundings back to a monitoring system (which may or may not be the location of the operator). The Remotely Operated Aerial Vehicle can also perform other activities, such as, delivering a package. Hobbyists typically use UAVs within line of sight as a recreational activity. These UAVs may or may not provide images and/or video back to the operator.

In most operating environments, a Remotely Operated Aerial Vehicle can be launched from a launch location accessible to the operator (e.g., hobbyist or pilot) and/or maintenance personnel. The Remotely Operated Aerial Vehicle is flown for some amount of time or to complete a specified mission. The Remotely Operated Aerial Vehicle is then flown to a landing location (which may or may not be the same as the launch location) and lands.

Some Remotely Operated Aerial Vehicles may also operate autonomously and/or in communication with a computer system. For example, a Remotely Operated Aerial Vehicle can be programmed to follow a designated path between different sets of coordinates. In some environments, a standby pilot can monitor a Remotely Operated Aerial Vehicle during autonomous or computer controlled flight. When appropriate (e.g., due to component failures, weather conditions, etc.), the pilot can disrupt autonomous flight and assume control of the Remotely Operated Aerial Vehicle. As such, the pilot may be able to safely land a Remotely Operated Aerial Vehicle when autonomous or computer controlled flight becomes unsafe.

BRIEF SUMMARY

The present invention extends to methods, systems, devices, and apparatus, for remotely operated aerial vehicles with reduced cross-section area during forward flight. In one aspect, a remotely operated aerial vehicle is a rotor based Unmanned Aerial Vehicle (UAV) having a plurality of rotors. The remotely operated aerial vehicle includes a frame, a power source, a plurality of motors, and a corresponding plurality of fixed rotors.

The frame also includes a top surface and a bottom surface that are essentially parallel to the ground when the remotely operated aerial vehicle flies in a specified forward direction. The power source is contained within the frame. Each of the plurality of motors are mounted to the frame and are powered by the power source.

Each fixed rotor in the plurality of fixed rotors is mounted to a corresponding motor from among the plurality of motors. The corresponding motor controls the rotation of the fixed rotor. Each of the plurality of fixed rotors is mounted at a specified angle relative to the top and bottom surfaces. Mounting the fixed rotors at the specified angle minimizes the cross-sectional area of the frame when the remotely operated aerial vehicle flies in the specified forward direction.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

Figure 1:
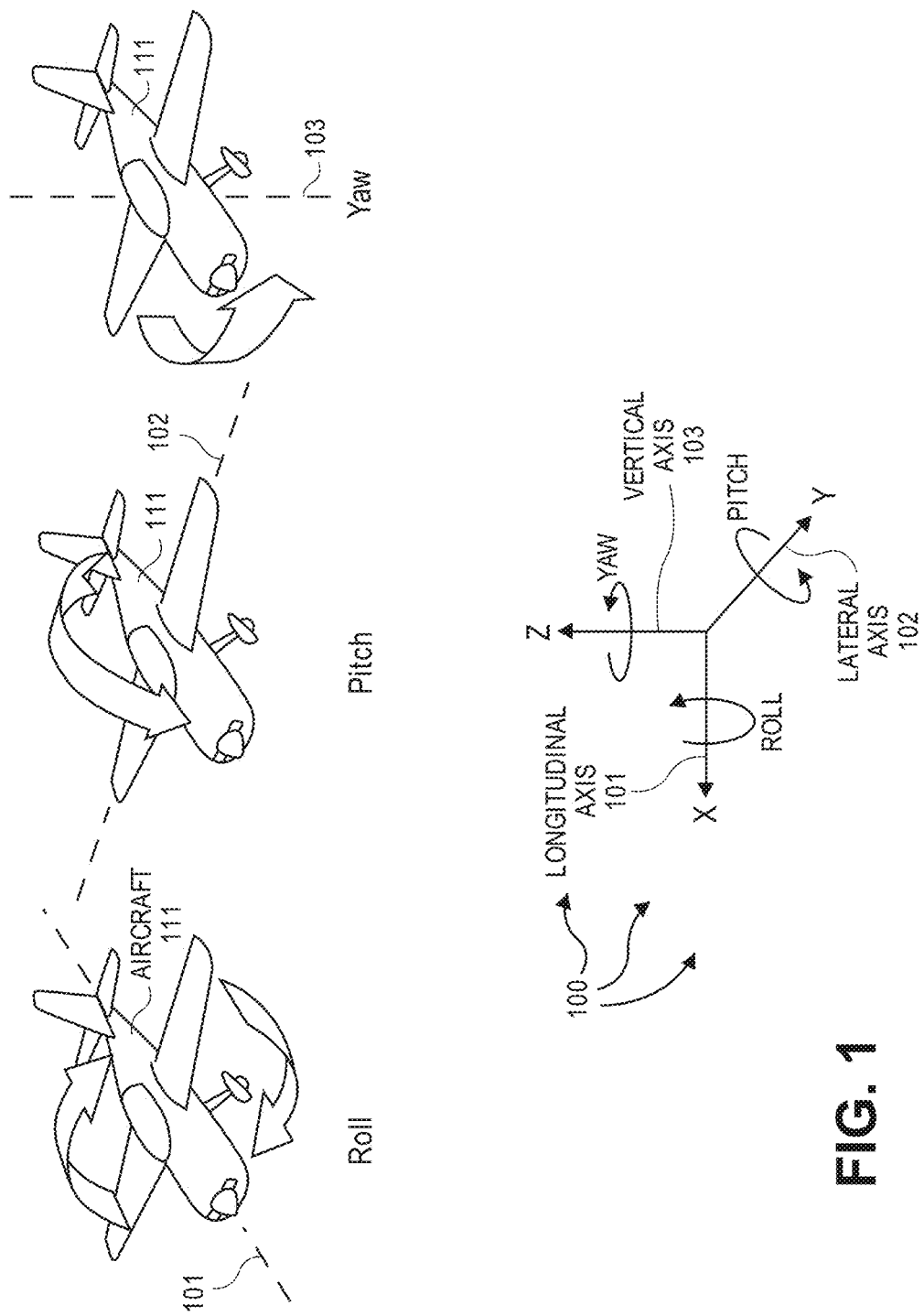
FIG. 1 illustrates an example three-dimensional space including a longitudinal axis, a lateral axis, and a vertical axis.

The present invention extends to methods, systems, devices, and apparatus, for remotely operated aerial vehicles with reduced cross-section area during forward flight. In one aspect, a remotely operated aerial vehicle is a rotor based Unmanned Aerial Vehicle (UAV) having a plurality of rotors. The remotely operated aerial vehicle includes a frame, a power source, a plurality of motors, and a corresponding plurality of fixed rotors.

The frame also includes a top surface and a bottom surface that are essentially parallel to the ground when the remotely operated aerial vehicle flies in a specified forward direction. The power source is contained within the frame. Each of the plurality of motors are mounted to the frame and are powered by the power source.

Each fixed rotor in the plurality of fixed rotors is mounted to a corresponding motor from among the plurality of motors. The corresponding motor controls the rotation of the fixed rotor. Each of the plurality of fixed rotors is mounted at a specified angle relative to the top surface. Mounting the fixed rotors at the specified angle minimizes the cross-sectional area of the frame when the remotely operated aerial vehicle flies in the specified forward direction.

Aspects of the invention can be used to reduce the forward equivalent cross-sectional area for a Remotely Operated Aerial Vehicle during flight. In some aspects, a vehicle is a Remotely Operated Aerial Vehicle, such as, a Remotely Piloted Aircraft (RPA) (and is potentially unnamed, for example, an Unmanned Aerial Vehicle (UAV)). In some aspects, a remotely operated aerial vehicle is a rotor-based UAV that includes a plurality of rotors. In some aspects, a rotor-based UAV is a quad-rotor UAV. In other aspects, a rotor-based UAV includes five or more rotors. A rotor based UAV can use rotors for one or more of: lift, maneuvering, and to change orientation. The rotors can be closed (e.g., contained in rotor housings) or open.

In general, an aircraft in flight is free to rotate in three dimensions: roll, pitch, and yaw. Roll is rotation about an axis running from nose to tail. Pitch is nose up or down about an axis running from wing to wing. Yaw is nose left or right about an axis running up and down. The axes are alternatively designated as: (1) longitudinal (the axis running from nose to tail), (2) lateral (the axis running from wing to wing), and (3) vertical (the axis running up and down), and (3). These axes move with the aircraft and rotate relative to the Earth along with the aircraft.

Aircraft movements and rotations are produced by torques (or moments) about the principal axes. On an aircraft, these are produced by means of moving control surfaces, which vary the distribution of the net aerodynamic force about the aircraft's center of mass. On an airplane, elevators (moving flaps on the horizontal tail) produce pitch, a rudder on the vertical tail produces yaw, and ailerons (flaps on the wings that move in opposing directions) produce roll.

On a rotor-based aircraft, one or more rotors can be tilted, run at different speeds, etc. to apply asymmetrical forces on the rotor-based aircraft to produce, roll, pitch, and yaw. To tilt forward and back (pitch) or sideways (roll), controls are used to alter the angle of attack of the main rotor blades cyclically during rotation, creating differing amounts of lift (force) at different points in the cycle. To rotate (yaw), controls are used to control tail rotor blades.

FIG. 1 illustrates a three-dimensional space 100 including longitudinal axis 101, lateral axis 102, and vertical axis 103. Aircraft 111 can rotate about longitudinal axis 101 to roll. The nose of aircraft 111 can be raised or lowered to pitch about lateral axis 102. The nose of aircraft 111 can be moved to one side or to the other side to yaw about vertical axis 103.

Figure 2A:
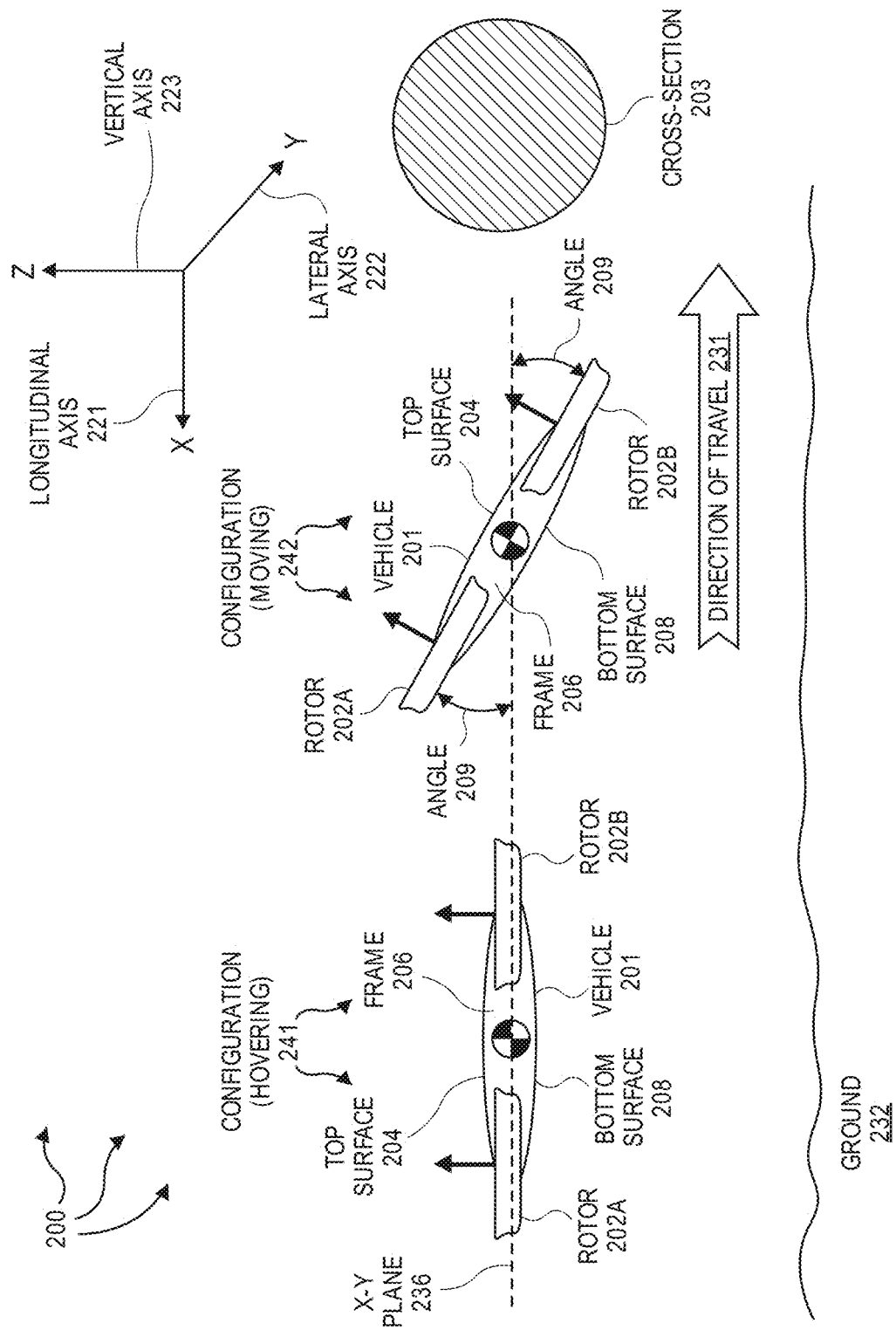
FIG. 2A illustrates a remotely operated aerial vehicle and corresponding cross-sectional area during forward flight.

Turning to FIG. 2A, FIG. 2A depicts a remotely operated aerial vehicle 201. Remotely operated aerial vehicle 201 is flying in three-dimensional space 200 represented by longitudinal axis 221, lateral axis 222, and vertical axis 223. In one aspect, vehicle 201 is a multi-rotor UAV. Vehicle 201 includes frame 206. Frame 206 has top surface 204 and bottom surface 208. A power source, such as, for example, batteries and/or a liquid fuel powered engine (not shown) can be contained in frame 206. A plurality of motors (not shown) can be mounted to frame 206 and connected to receive power from the power source.

A fixed rotor can be mounted to each motor. Rotors 202A and 202B are depicted. Each of rotors 202A and 202B can fixed rotors and can be connected to a motor. Additional fix rotors (not visible) can be mounted to other motors included in the plurality of motors. Rotors 202A, 202B, and any other rotors can be mounted essentially parallel to top surface 204 and bottom surface 208. In one aspect, there is a one to one correspondence between motors and rotors. Each of the rotors can be enclosed in part of frame 206 or can be open.

In the arrangement of vehicle 201, frame 206 and rotors 202A and 202B are essentially at the same pitch relative to X-Y plane 236. X-Y plane 236 is a plane formed by longitudinal axis 221 and lateral axis 222. Thus, in configuration 241 (i.e., when hovering), frame 206 and rotors 202A and 202B are essentially in line with X-Y plane 236 (and are essentially parallel to ground 232). In configuration 241, rotors 202A and 202B provide lift essentially along vertical axis 223 (i.e., perpendicular to ground 232).

To produce force with a component along longitudinal axis 221 (and fly in direction of travel 231), vehicle 201 can be transitioned to configuration 242 (moving). To transition to configuration 242, the end of vehicle 201 that includes rotor 202B can be tilted below X-Y plane 236 to pitch vehicle 201 (relative to lateral axis 222) as indicated by angle 209. Angle 209 can be between 1 and 45 degrees. In one aspect, angle 209 is between 25 and 40 degrees. In configuration 242, vehicle 201 has forward equivalent cross-section area approximated by cross-section 103.

Figure 2B:
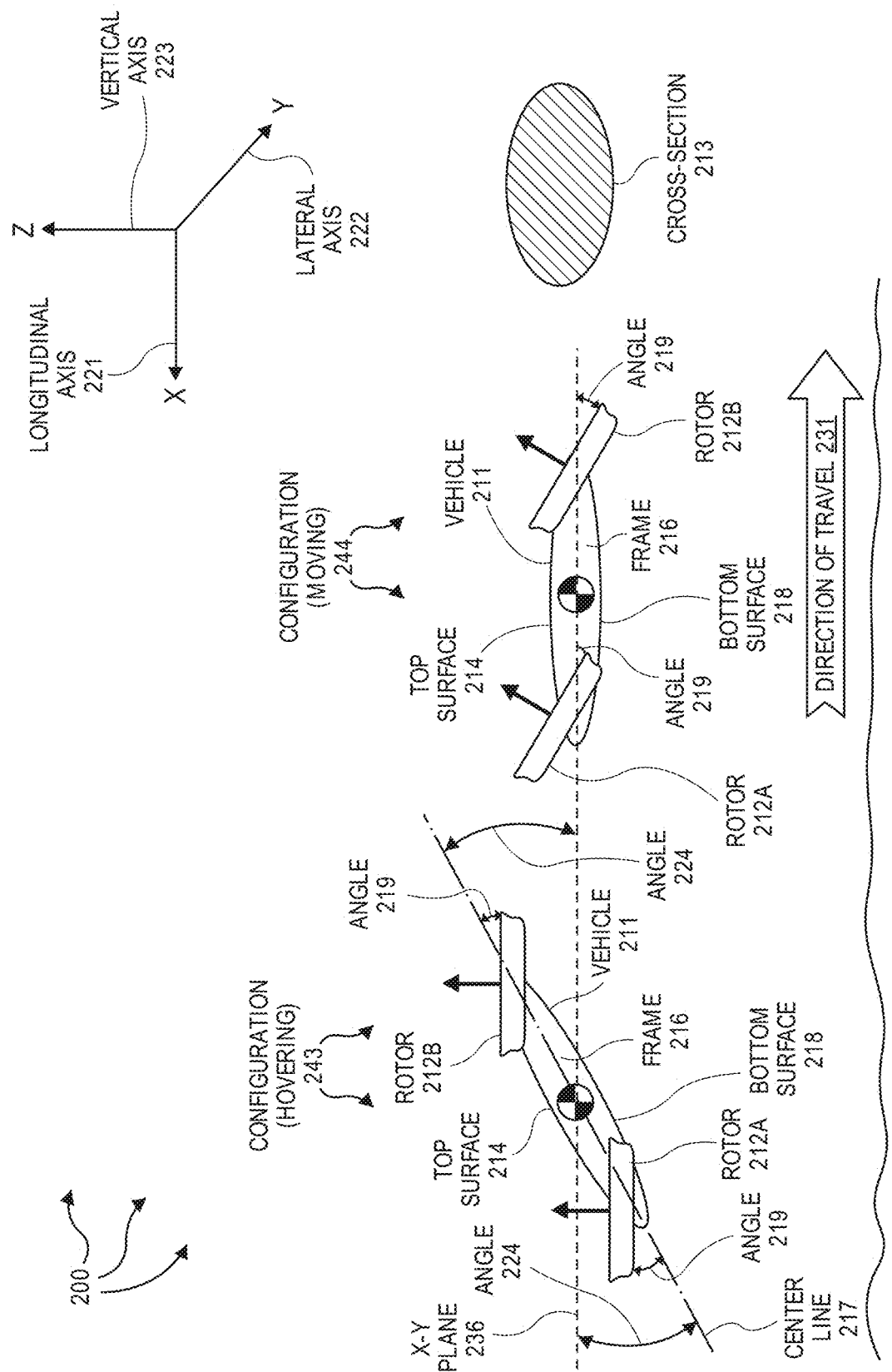
FIG. 2B illustrates another remotely operated aerial vehicle and corresponding cross-sectional area during forward flight.

Turning to FIG. 2B, FIG. 2B depicts a remotely operated aerial vehicle 211. Remotely operated aerial vehicle 211 flying in three-dimensional space 200 represented by longitudinal axis 221, lateral axis 222, and vertical axis 223. In one aspect, vehicle 211 is a multi-rotor UAV. Vehicle 211 includes frame 216. Frame 216 has top surface 214 and bottom surface 218. A power source, such as, for example, batteries and/or a liquid fuel powered engine (not shown) can be contained in frame 216. A plurality of motors (not shown) can be mounted to frame 216 and connected to receive power from the power source.

A fixed rotor can be mounted to each motor. Rotors 212A and 212B are depicted. Each of rotors 212A and 212B can fixed rotors and can be mounted to a motor. Additional fix rotors (not visible) can be mounted to other motors included in the plurality of motors. In one aspect, there is a one to one correspondence between motors and rotors. Each of the rotors can be enclosed in part of frame 206 or can be open.

Each of the rotors 212A, 212B, and any other rotors can be mounted at angle 219 relative to center line 217 (an imaginary line approximating the center of vehicle 211). Similar to angle 209, angle 219 can be between 1 and 45 degrees. In one aspect, angle 219 is between 25 and 40 degrees.

In the arrangement of vehicle 211, frame 216 and rotors 212A and 212B are at different pitches relative to X-Y plane 236. In configuration 243 (i.e., when hovering), the end of vehicle 211 that includes rotor 212B is tilted above X-Y plane 236 to pitch vehicle 211 as indicated by angle 224. Angle 224 can be between 1 and 45 degrees. In a more specific aspect, angle 224 is between 30 and 45 degrees. In an even more specific aspect, angle 224 is approximately 40 degrees. In configuration 243, Rotors 212A and 212B are essentially in line with X-Y plane 236 (and are essentially parallel to ground 232). In configuration 243, rotors 212A and 212B provide lift essentially along vertical axis 223 (i.e., perpendicular to ground 232).

To produce force with a component along longitudinal axis 221 (and fly in direction of travel 231), vehicle 211 can be transitioned to configuration 244 (moving). To transition to configuration 244, the end of vehicle 201 that includes rotor 212B can be tilted down by a number of degrees approximately equal to angle 224. In configuration 244, frame 216 (and central line 217) is essentially in-line with X-Y plane 236 (and essentially parallel to ground 232). In configuration 244, rotors 212A and 212B are titled below X-Y plane 236 to pitch rotors 212A and 212B as indicated by angle 219. In configuration 244, vehicle 211 has forward equivalent cross-section area approximated by cross-section 213.

However, frame 216 can be tilted (pitched) some number of degrees below X-Y plane 236 or above X-Y plane 236 and have an equivalent cross-section area approximated by cross-section 213.

Thus, vehicle 211 (frame 216) has a smaller approximated cross-section area 213 relative to the approximated cross-section area 203 of vehicle 201 (frame 206) when flying in direction of travel 231. That is, when rotors 212A and 212B and rotors 202A and 202B are pitched at approximately the same angle to produce force with a component along longitudinal axis 221 vehicle 211 (frame 216) has a smaller cross-section area.

In one aspect, vehicle 201 and vehicle 211 include essentially identical components. Thus, when flying in direction of travel 231, vehicle 211 has less drag than vehicle 201. With less drag, vehicle 211 is capable of a higher top speed. Accordingly, vehicle 211 may be better suited for pursuit applications relative to vehicle 201. For example, vehicle 211 can be capable of top speeds from 100 km/h to 150 km/h.

Vehicle 211 can also be rotated (yaw) around vertical axis 223 to be oriented in directions other than direction of travel 231. When moving in any of these other directions, vehicle 211 also has forward equivalent cross-section area approximated by cross-section 213.

Figure 3B:
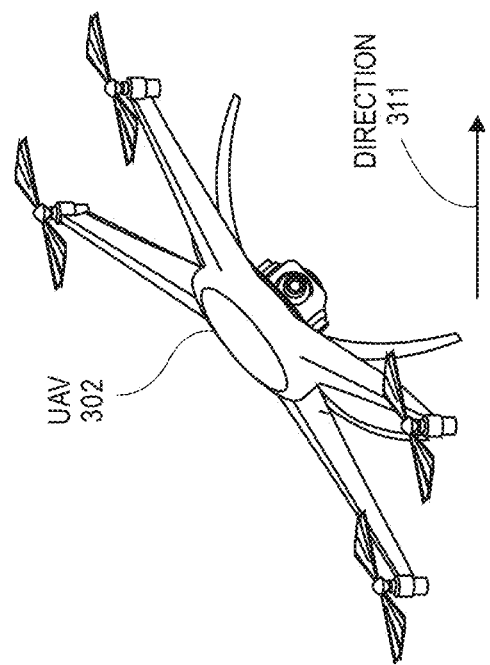
FIG. 3B illustrates an example Unmanned Aerial Vehicle (UAV) with rotors configured for reduced cross-section area during forward flight.
Figure 3A:
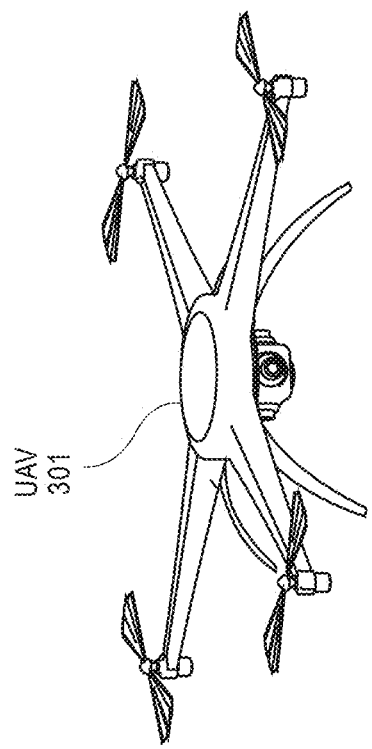
FIG. 3A illustrates an example Unmanned Aerial Vehicle (UAV).

FIG. 3A illustrates an example UAV 301 having a configuration similar to vehicle 201. That is, the frame and fixed rotors of UAV 301 are at essentially the same pitch. Relative to the cross-section area when hovering, tilting UAV 301 to fly in any direction increases the cross-section area of UAV 301

FIG. 3B illustrates an example UAV 302 having a configuration similar to vehicle 211. That is, the frame is at one pitch and the rotors are at another different pitch. Relative to the cross-section area when hovering, titling UAV 302 to fly in direction 311 reduces the cross-section area of UAV 302. UAV 302 can also be rotated (yaw) around a vertical axis to be oriented in directions other than direction 311. When moving in any of these other directions, vehicle 302 can also have a reduced cross-section area.

In general, analog and/or digital systems can be used to monitor and control remotely operated aerial vehicles (e.g., vehicle 201 and/or vehicle 211), such as, for example, to change one or more of: roll, pitch, and yaw to control movement in a three-dimensional space. Monitoring and control equipment (e.g., used by a UAV operator, such as, a pilot) can be co-located with and/or separate one another. Information exchanged between remotely operated aerial vehicles and monitoring and control equipment can be relayed over a wired and/or wireless communication networks.

Remotely operated aerial vehicles can include computer network connectivity components (e.g., a Network Interface Card ("NIC") or cellular modem) for wired or wirelessly connecting the monitoring equipment to a computer network. As such, modules, algorithms, components, etc., for controlling the flight of remotely operated aerial vehicles (e.g., direction, speed, acceleration, pitch, yaw, roll) can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for controlling the flight of remotely operated aerial vehicles (e.g., direction, speed, acceleration, pitch, yaw, roll) as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Aspects of the present invention may comprise or utilize a special purpose or general-purpose computer including computer hardware, such as, for example, one or more processors and system memory, as discussed in greater detail below. Aspects within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, Aspects of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A remotely operated aerial vehicle comprising:
a frame including a top surface;
a power source contained within the frame;
a plurality of motors mounted to the frame, the motors powered by the power source; and
a plurality of fixed rotors, each fixed rotor included in the plurality of fixed rotors mounted to a corresponding motor from among the plurality of motors, the corresponding motor controlling the rotation of the fixed rotor, each of the plurality of fixed rotors mounted at a specified angle relative to the top surface; and
wherein, based on the specified angle, the remotely operated aerial vehicle has a first cross-sectional area when hovering and the remotely operated area vehicle has a second cross-sectional area when moving in a specified direction, the second cross-sectional area being smaller than the first cross-sectional area.

2. The remotely operated aerial vehicle of claim 1, wherein the remotely operated aerial vehicle is a quad-rotor Unmanned Aerial Vehicle (UAV).

3. The remotely operated aerial vehicle of claim 1, wherein the plurality of fixed rotors comprises six rotors.

4. The remotely operated aerial vehicle of claim 1, wherein the plurality of fixed rotors comprises a plurality of open rotors.

5. The remotely operated aerial vehicle of claim 1, wherein the frame includes a plurality rotor housings; and
wherein the plurality of fixed rotors are enclosed within the plurality of rotor housings.

6. The remotely operated aerial vehicle of claim 1, wherein the power source includes one or more of: a battery or an engine that consumes liquid fuel.

* * * * *